Figure 1:
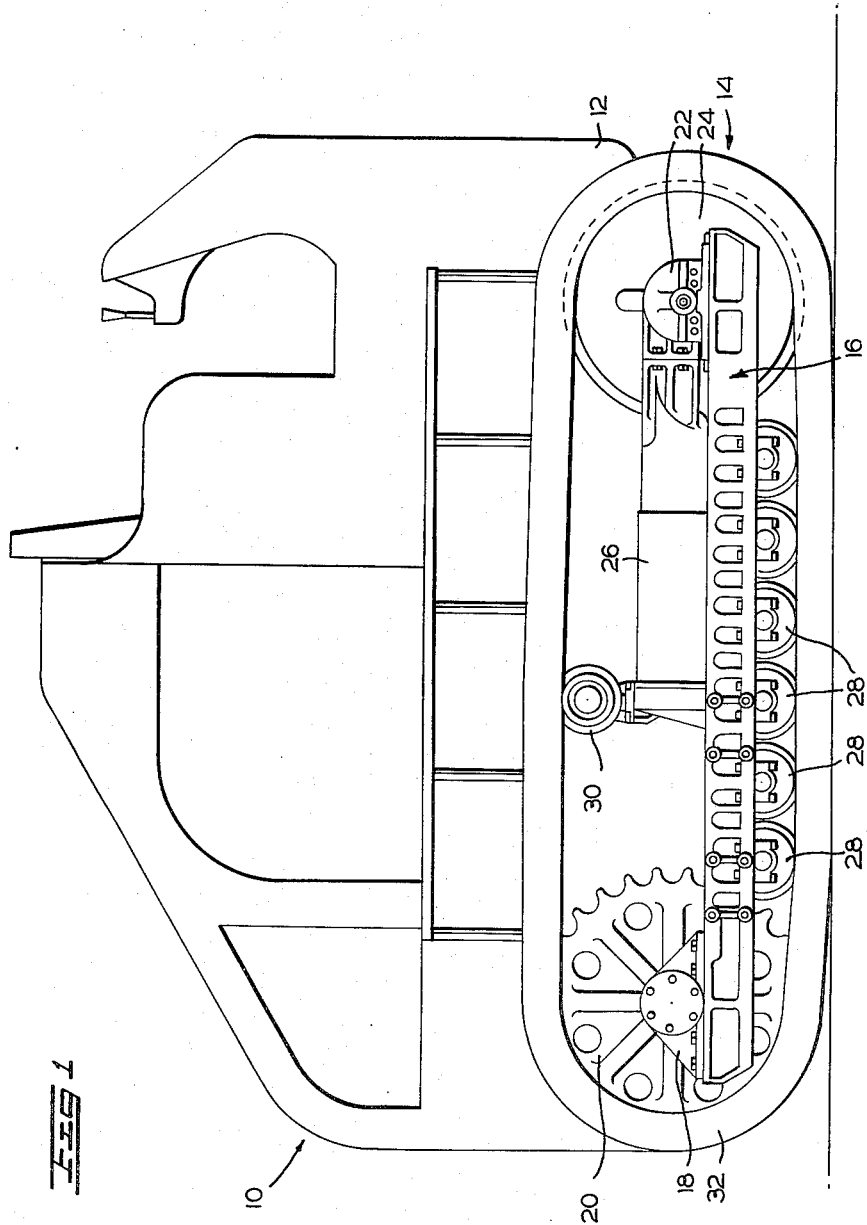

July 4, 1961  D. M. SCHWARTZ ET AL  2,991,132
VEHICLE TRACK FRAME CONSTRUCTION
Filed June 5, 1959  5 Sheets-Sheet 1

INVENTORS
DANIEL M. SCHWARTZ
FRANZ WEBER
THEODORE N. HACKETT
BY
*Harold T. Stowell*
*Harold L. Stowell*
ATTORNEYS

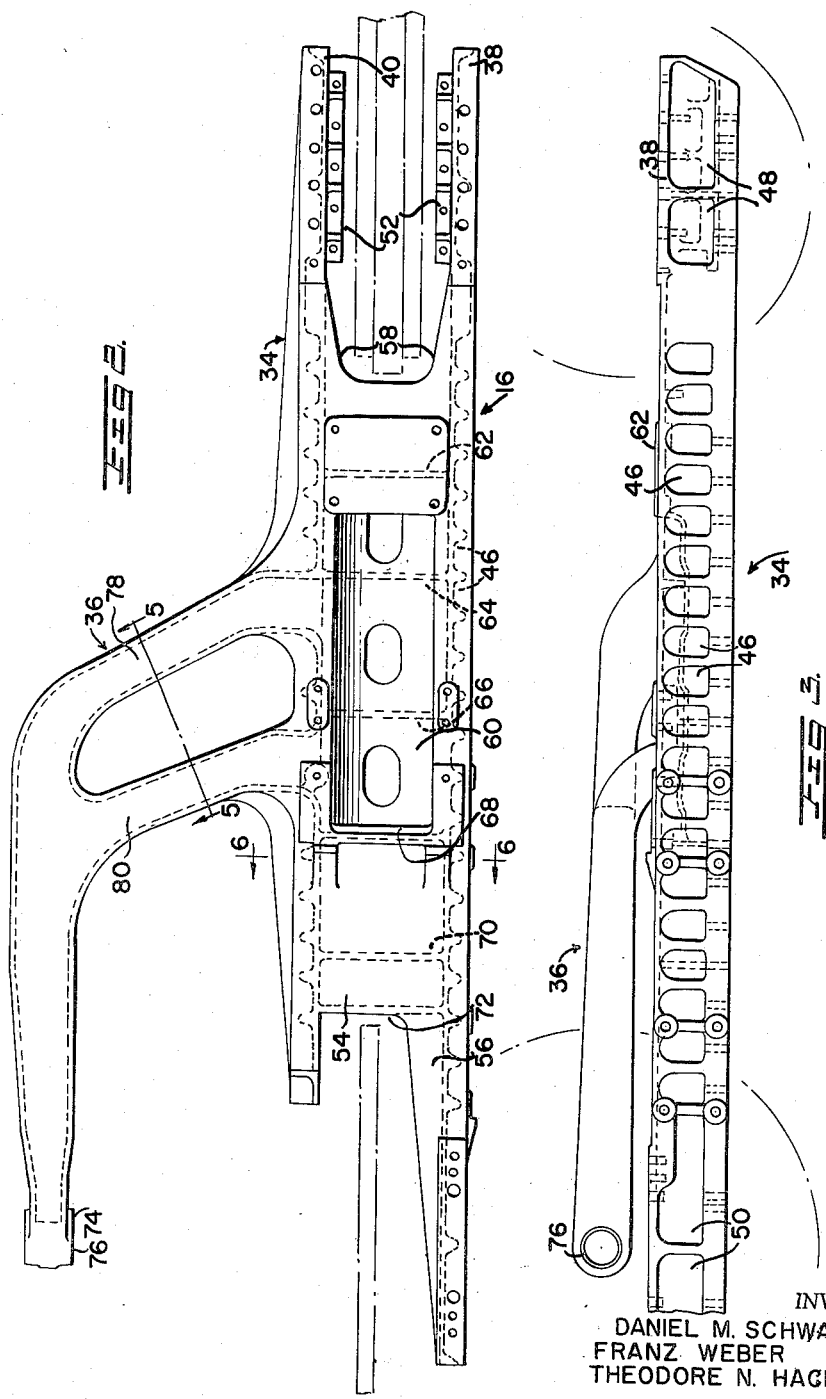

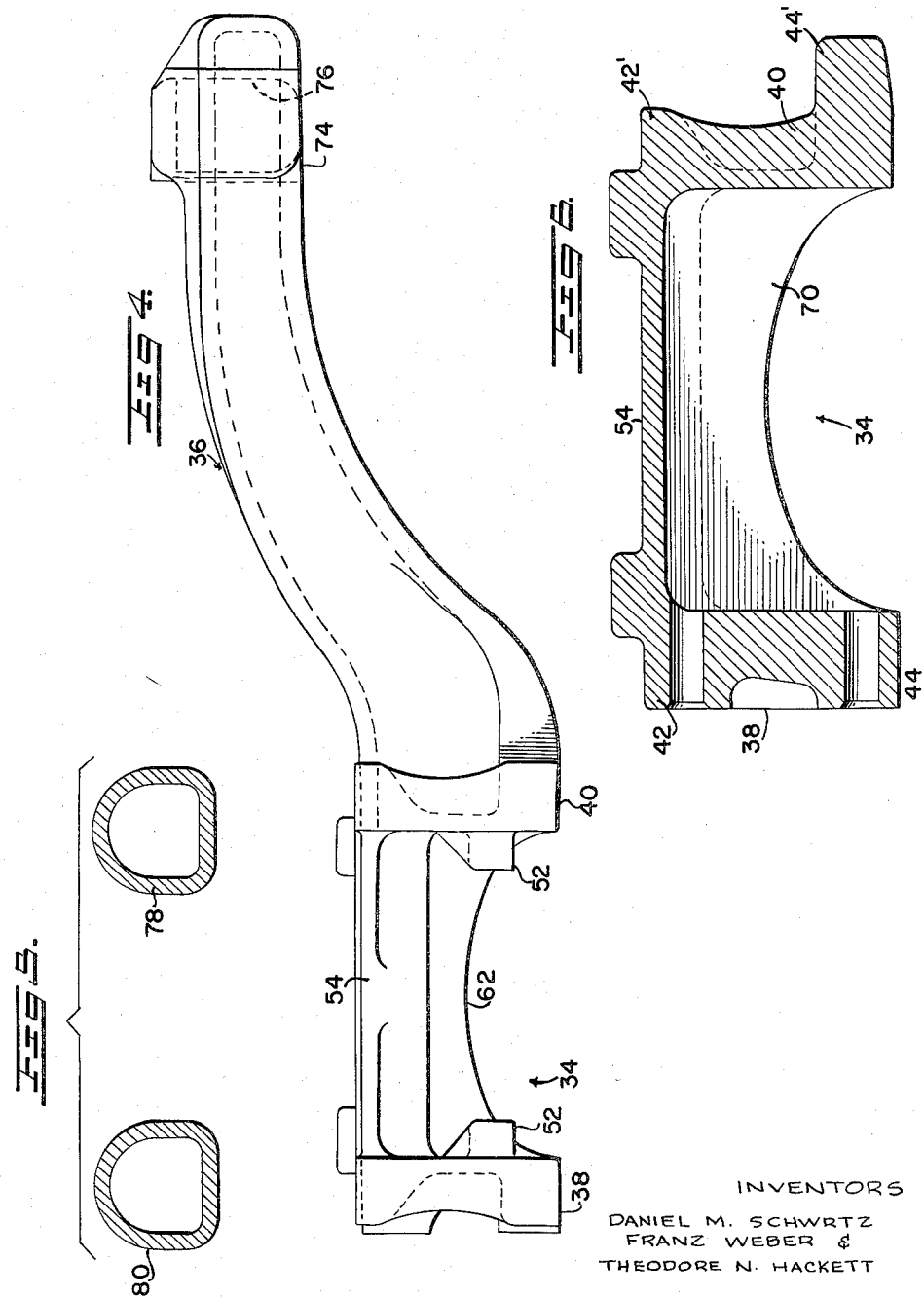

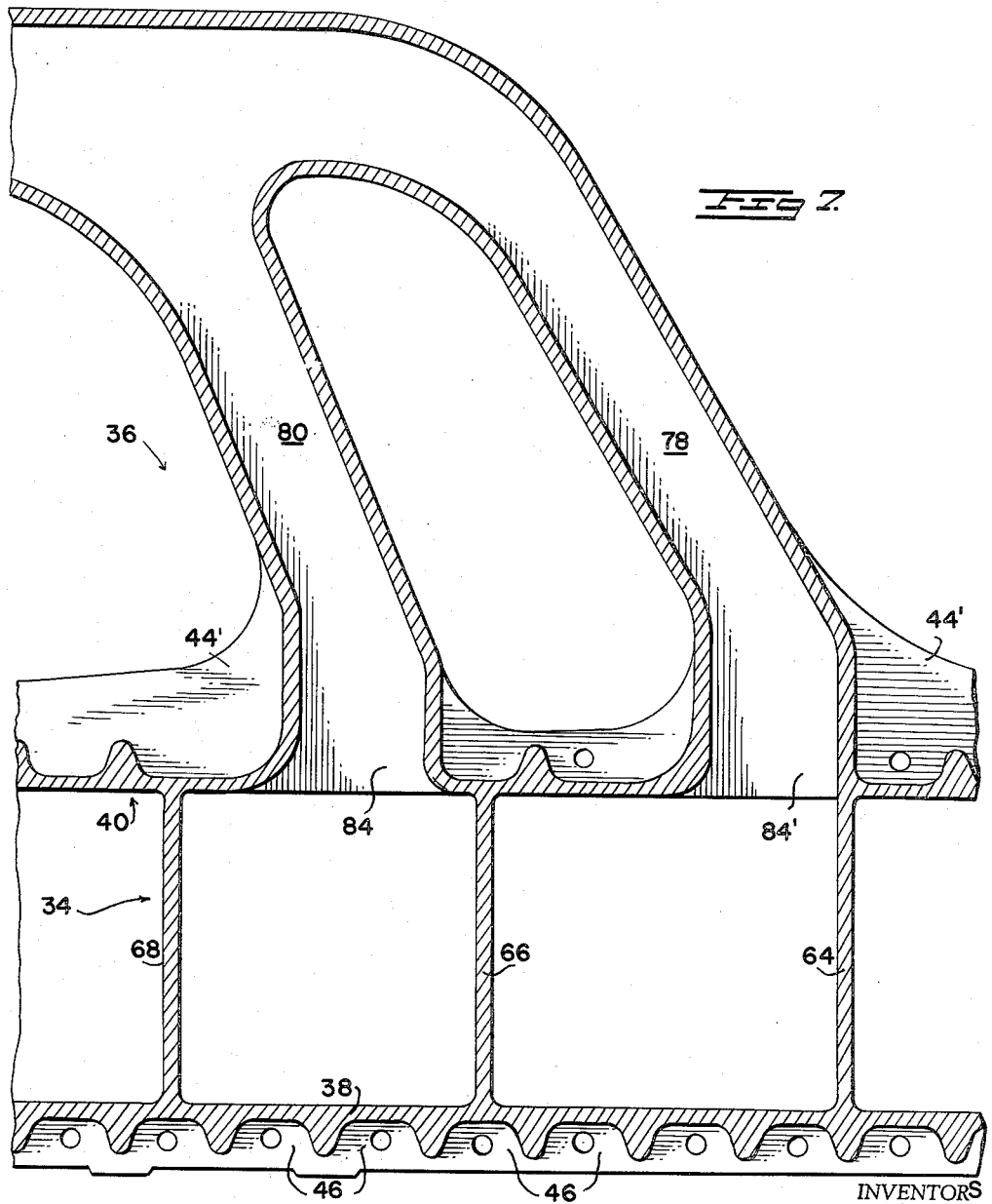

July 4, 1961     D. M. SCHWARTZ ET AL     2,991,132
VEHICLE TRACK FRAME CONSTRUCTION
Filed June 5, 1959     5 Sheets-Sheet 5
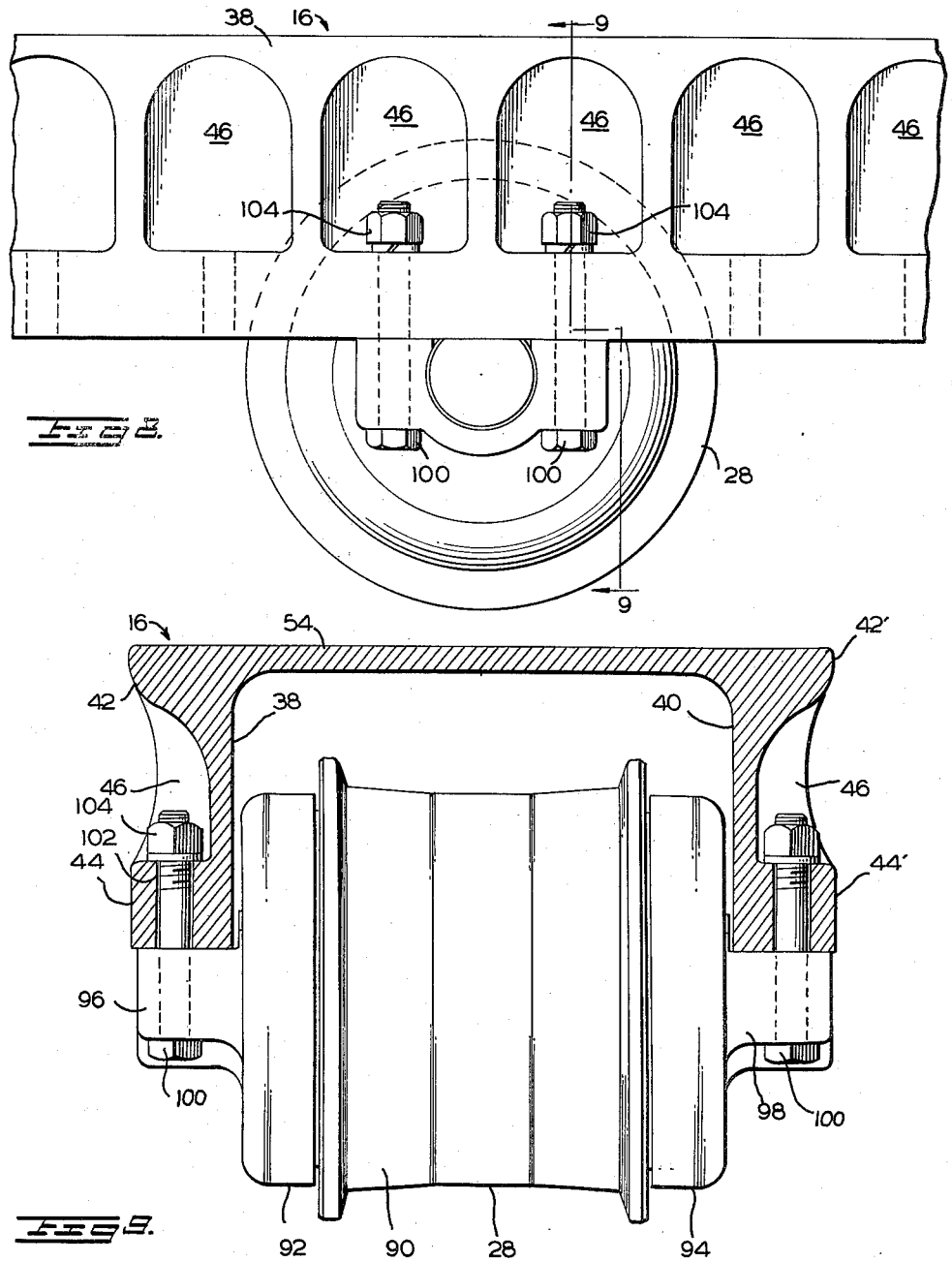
INVENTORS
DANIEL M. SCHWARTZ
FRANZ WEBER
BY THEODORE N. HACKETT
ATTORNEYS United States Patent Office 2,991,132
Patented July 4, 1961

2,991,132
VEHICLE TRACK FRAME CONSTRUCTION
Daniel M. Schwartz, Theodore N. Hackett, and Franz Weber, Salt Lake City, Utah, assignors to The Eimco Corporation, Salt Lake City, Utah, a corporation of Delaware
Filed June 5, 1959, Ser. No. 818,330
5 Claims. (Cl. 305—60)

This invention relates to a vehicle track frame and more particularly to an improved unitary cast track frame and diagonal brace for supporting endless track mechanisms of crawler-type vehicles.

Crawler mounted vehicles such as the material handling machine disclosed in U.S. Patent 2,792,140, D. M. Schwartz, dated May 14, 1957, include a main frame or body which is supported on paired longitudinally extending endless track structures. The endless track structures include a track frame carrying at one end a drive sprocket, and at the other end, an idler wheel which may be adjustably mounted to the frame. About the drive sprocket and idler wheel is an endless track. The track frame is provided with a diagonal brace and the track frame and diagonal brace are mounted to the main frame of the vehicle for independent oscillation in respect thereto so that as the vehicle travels over uneven ground, independent oscillation of the track frames materially reduce stresses which would otherwise be transmitted to the frame of the vehicle.

The rugged duty cycle of crawler mounted material handling machines, particularly during turning, requires that the track frame and diagonal brace construction be of the type to withstand severe stresses. For example, in turning such vehicles, one of the endless track mechanisms may be locked while the other endless track is driven. The locked track mechanism is caused to skip upon the ground and where the ground is uneven, severe stresses are placed on the locked track frame.

It is, therefore, a primary object of the present invention to provide a unitary cast track frame and diagonal brace that has minimum weight with maximum strength and rigidity.

A further object is to provide such a track frame construction wherein the diagonal brace portion is a structural portion of the track frame.

A further object is to provide such a cast track frame having pockets provided therein for the reception of means for attaching track rollers and other structures thereto.

A further object is to provide a unitary cast crawler frame wherein the distribution of metal to obtain strength where needed and reduced weight where high strength is not required is readily accomplished.

Other objects are to provide a track frame construction which is of comparatively light construction; economical to manufacture and uniform in reproduction.

These and other objects and advantages are provided in a unitary cast track frame for a crawler type vehicle comprising an elongated bed portion and a generally diagonally extending offset portion cast integrally with the bed portion, the bed portion including elongated generally parallel side members, a bed web integrally joining the side members throughout a substantial portion of their length, and further longitudinally spaced transverse webs integrally joining said bed web and said side members, said diagonally offset portion including a generally tubular member, a portion of the wall thereof being the corresponding side member and bed web of the elongated bed portion at the juncture of the diagonal portion and the bed portion.

The invention will be more particularly described with reference to the accompanying illustrations wherein:

FIG. 1 is an elevational view of the right side of a material handling machine incorporating the improved crawler frames of the invention;
FIG. 2 is a plan view of the right side crawler frame and diagonal brace constructed in accordance with the teachings of the invention;
FIG. 3 is a fragmentary side elevational view of the frame and diagonal brace structure shown in FIG. 2;
FIG. 4 is a front elevational view of the frame and diagonal brace shown in FIGS. 2 and 3;
FIG. 5 is a section substantially on line 5—5 of FIG. 2;
FIG. 6 is a section substantially on line 6—6 of FIG. 2;
FIG. 7 is an enlarged fragmentary cutaway view of the center portion of the improved track frame shown in FIGS. 2 and 3;
FIG. 8 is an enlarged fragmentary elevational view of the track frame shown in FIG. 1 detailing the mounting means for one of the track rollers; and
FIG. 9 is a section substantially on line 9—9 of FIG. 8.

Referring to the drawings and, in particular, to FIG. 1, 10 generally designates a material handling machine having a body or main frame 12 and paired longitudinally extending ground engaging crawler units 14. Each of the crawler units 14 comprises a frame 16 which supports at the rear end of the vehicle a bearing bracket 18 for rotatably mounting a driven sprocket 20 which is suitably connected to the prime mover of the vehicle such as shown, for example, in U.S. Patent 2,792,140, D. M. Schwartz, dated May 14, 1957.

The other end of the frame 16 slidably mounts a bearing bracket 22 which with a companion bracket rotatably supports an idler wheel 24. The idler wheel mounting brackets 22 are connected to crawler chain tensioning mechanism generally designated 26 which may be of conventional design. The frame 16 also supports a plurality of lower flight track rollers 28 and an upper flight track roller 30.

An endless belt type track 32 extends about the front idler wheel 24 and the rear drive sprocket 20 and contacts in its lower flight track rollers 28 and in its upper flight track roller 30.

The construction of the improved track frame 16 for the right side of the vehicle is more clearly shown in FIGS. 2 through 9.

Referring to these drawings, the unitary cast track frame 16 includes an elongated bed portion 34 and a generally diagonally extending offset brace portion 36 which together comprises a single casting. The elongated bed portion 34 includes an outer side member 38 and an inner side member 40 which extends in spaced relation generally parallel to the outer side member 38. Each of the side members 38 and 40, as more clearly seen in FIGS. 6 and 9, are of U-shape in cross-section with the legs 42 and 44 and 42' and 44', respectively, facing in opposite directions. This U-shape construction of the side members 38 and 40 reduces twisting of the cast frame and keeps the weight of the cast frame at a minimum.

Each of the side members 38 and 40 is cast with a plurality of pockets 46 for the reception of track roller retaining bolts and the like as to be more fully described hereinafter; pockets 48 for the front idler bracket retaining bolts; and pockets 50 for the rear sprocket bearing bracket attaching bolts.

Also cast on the inner forward surface of each of the side members 38 and 40 is an extended boss 52 for retaining slide bearing blocks for the slidably mounted front idler wheel 24.

The bed portion 34 of the frame also includes a bed web generally designated 54. The bed web 54 extends through a major portion of the length of the side members 38 and 40 and provides the means for integrally joining the side members. Adjacent the front or forward end of the frame 16, the bed web is absent to provide the space for the slidably mounted idler wheel 24. The bed web is also absent adjacent the most rearward ends of the side members 38 and 40 to provide space for rotation of the drive sprocket 20. It will be noted, however, that the bed web 54 provides a strengthening fin 56 along the most rearward portion of side member 38 and a pair of strengthening webs 58 adjacent the zone of rotation of the front idler wheel 24.

It will also be noted that the bed web is arcuately depressed in a zone 60 intermediate the ends of the side members 38 and 40. The depressed portion 60 is provided to receive the idler wheel position adjusting means disclosed in detail in U.S. Patent 2,959,451 by Franz Weber.

The frame casting 16 also includes a plurality of transverse webs designated 62, 64, 66, 68, 70 and 72 which integrally join the bed web 54 and the side members 38 and 40. As more clearly shown in FIGS. 4 and 6, the transverse webs 62 through 72 have their lower free edge concave in form and in addition transverse webs 64, 66 and 68 have their upper surfaces concave to conform to the depressed portion 60 of the bed web 54.

The generally diagonally extending offset brace portion 36 is tubular in cross-section and is provided at its extended end 74 with a bore 76 adapted to receive a hinge pin, thereby providing one of the hinge points of connection between the crawler frame and the main frame of the vehicle with the other hinge point comprising the bearing for the drive sprocket 20. The diagonally extending brace portion 36 is generally Y-shape in configuration with the legs 78 and 80 providing spaced points of junction with the bed portion 34 to reduce stresses in the improved frame while reducing the weight thereof.

Referring particularly to FIGS. 2 and 7, it will be seen that a portion of the tubular wall of the diagonal offset portion 36 is composed of the corresponding side member and bed web of the bed portion 34 and the remainder of the wall of the tubular diagonal brace is the extension of the lower leg 44′ of side member 40. Therefore, in the area of juncture between the diagonal portion 36 and the bed portion 34 of the frame 16, there are open spaces designated 84 and 84′. Thus, the diagonal brace portion of the casting is seen to be a structural portion of the track frame itself so that corresponding metal can be eliminated from the track frame portion since the tubular diagonal brace portion is a component part of the frame.

In rolled steel construction of conventional track frames and diagonal braces where the diagonal braces are joined, either by welding or bolting to their frame portions, at least one of the elements must have a continuous surface to provide a surface for joining the elements together, thus increasing the weight of the finished product without necessarily increasing its structural strength. The greater space requirements of conventional welded or bolted track frame and diagonal brace constructions presents particular problems where space is at a premium, such as between the vehicle body and the track frame structures.

It will also be noted from FIGS. 2 and 7 that the leg 44′ of the side member 40 flares outwardly toward the diagonal brace portion 36 from either end of the side member to provide additional strength to the integral casting where maximum stresses are applied in operation of the vehicle.

Referring particularly to FIGS. 8 and 9, mounting of one of the plural track rollers is illustrated. Each of the track rollers 28 comprises a barrel portion 90 rotatably mounted in end bearing members 92 and 94 which end bearing members are mounted in brackets 96 and 98, respectively. Brackets 96 and 98 are provided with bolts 100 which pass through the brackets and through bores 102 in the leg portions 44 and 44′ of side members 38 and 40 so that the nuts 104 for the bolts 100 are positioned within the pockets 46 cast in the assembly. With this form of construction, the head of the bolts and the nuts are fully exposed where they can be easily tightened and if the threaded nut or bolt is damaged, it can be replaced easily without disturbing the track frame. In prior art constructions, track roller bolts extended through the bottom flange of the channel members into tapped strips or the track rollers were bolted to bars welded to the track frames with the bars having tapped holes therein to receive the track roller bolts. In each of these constructions, it has been found to be difficult to maintain tightness of the track roller bolts and if the threads in the integral tapped bar or in the solid track frame were damaged, it was difficult and expensive to repair the threads to provide adequate tightness for the rollers.

The other pockets 46 not employed in securing track rollers to the track frame are available as mounting stations so that auxiliary implements or mechanisms can be mounted thereon with comparative ease and without modifying the track frame construction.

While the track frame for only the right side of a crawler mounted vehicle has been shown and described herein, it will be appreciated that the left side track frame is a mirror form of the frame described and that such pair of frames are utilized in mounting the pair of crawler tracks for crawler type vehicles.

Having described the preferred embodiment of the present invention, it will be apparent to those skilled in the art that various changes and modifications may be made therein without departing from the spirit and the scope of the appended claims.

We claim:
1. A unitary cast track frame for a crawler type tractor comprising an elongated bed portion and a generally diagonally extending offset portion cast integrally with said bed portion, said bed portion including elongated generally parallel side members and a bed web integrally joining said side members throughout a substantial portion of their length, said diagonally offset portion including a generally tubular member, a portion of said tubular member being formed by one of said side members and the bed web of said elongated bed portion at the juncture of the diagonal portion and the elongated bed portion.

2. The invention defined in claim 1 including spaced pockets cast in each of said side members substantially throughout their length.

3. The invention defined in claim 1 wherein said tubular member forming said generally diagonally offset portion also being formed by a continuation of a web extending throughout the length of said one of said side members.

4. The invention defined in claim 1 including further longitudinally spaced transverse webs integrally joining said bed web and said side members.

5. A unitary cast track frame for a crawler type tractor comprising an elongated bed portion and a generally diagonally extending offset portion cast integrally with said bed portion, said bed portion including elongated generally parallel side members, said side members having a generally U-shaped configuration with the legs of the U forming the upper and lower surfaces thereof, a bed web integrally joining said side members throughout a substantial portion of their length, said diagonally offset portion including a generally tubular member, said tubular member being formed by one of the side members and the bed web of said elongated bed portion at the juncture of the diagonal portion and the elongated bed portion.

References Cited in the file of this patent

UNITED STATES PATENTS 2,049,672    Starr ------------------ Aug. 4, 1936